US012587994B2

(12) United States Patent
Boban et al.

(10) Patent No.: US 12,587,994 B2
(45) Date of Patent: Mar. 24, 2026

(54) METHOD AND APPARATUS FOR ASSISTING POSITIONING OVER SIDELINK

(71) Applicant: HUAWEI TECHNOLOGIES CO., LTD., Shenzhen (CN)

(72) Inventors: Mate Boban, Munich (DE); Xitao Gong, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 298 days.

(21) Appl. No.: 18/463,368

(22) Filed: Sep. 8, 2023

(65) Prior Publication Data

US 2023/0422205 A1 Dec. 28, 2023

Related U.S. Application Data

(63) Continuation of application No. PCT/EP2021/056024, filed on Mar. 10, 2021.

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC .............................. H04W 64/00; H04L 5/0051
USPC ....................................................... 455/456.1
See application file for complete search history.

(56) References Cited

U.S. PATENT DOCUMENTS

| | | | | |
|---|---|---|---|---|
| 2013/0029686 A1* | 1/2013 | Moshfeghi | ............ | H04W 4/021 |
| | | | | 455/456.1 |
| 2017/0212206 A1 | 7/2017 | Kim et al. | | |
| 2019/0239181 A1* | 8/2019 | Gangakhedkar | ...... | H04W 76/10 |
| 2020/0120447 A1* | 4/2020 | Rydén | ................... | H04W 4/029 |

FOREIGN PATENT DOCUMENTS

| | | |
|---|---|---|
| WO | 2019197036 A1 | 10/2019 |
| WO | 2020064120 A1 | 4/2020 |
| WO | 2020231303 A1 | 11/2020 |
| WO | 2021204356 A1 | 10/2021 |
| WO | 2022152389 A1 | 7/2022 |

OTHER PUBLICATIONS

Beakcheol Jang et al: "IPSCL: An Accurate Indoor Positioning Algorithm Using Sensors and Crowdsourced Landmarks", Sensors 2019, 19, 2891, Jun. 29, 2019, total 19 pages.

(Continued)

*Primary Examiner* — Michael R Neff

(57) ABSTRACT

The present disclosure relates to a location reference device (LRD) for assisting positioning over sidelink. The LRD comprises a communication interface configured to: receive a location assistance request from a user device or a network element for positioning, wherein the location assistance request indicates a location reference for a positioning of the user device over a sidelink; and transmit a location message over the sidelink, wherein the location message indicates that the LRD is capable of serving as a location reference for the positioning of the user device over sidelink.

18 Claims, 9 Drawing Sheets

(56)　　　　　　References Cited

OTHER PUBLICATIONS

Takahiro Yamaguchi, Kazumasa Takami, A Reference Point Construction Method Using Mobile Terminals and the Indoor Localization Evaluation in the Centroid Method, Computers 2015, 4, pp. 155-175, May 22, 2015, total 21 pages.

Kuo-Feng Ssu et al: "Localization With Mobile Anchor Points in Wireless Sensor Networks", IEEE Transactions on Vehicular Technology, vol. 54, No. 3, May 2005, total 11 pages.

Mihail L. Sichitiu et al: "Localization of Wireless Sensor Networks with a Mobile Beacon", 2004 IEEE International Conference on Mobile Ad-hoc and Sensor Systems, Oct. 2004, total 10 pages.

Prabal Dutta, Sarah Bergbreiter, MobiLoc: Mobility Enhanced Localization, Jan. 15, 2004, total 12 pages.

Guo-Lin Sun, Wei Guo, Comparison of Distributed Localization Algorithms forSensor Network with a Mobile Beacon, IEEE International Conference on Networking, Sensing and Control, 2004, Mar. 2004, total 5 pages.

A. Galstyan et al: "Distributed online localization in sensor networks using a moving target", Third International Symposium on Information Processing in Sensor Networks, 2004. IPSN 2004, Apr. 2004, total 10 pages.

Zhuoling Xiao et al: "Non-Line-of-Sight Identification and Mitigation Using Received Signal Strength", IEEE Transactions on Wireless Communications, vol. 14, No. 3, Mar. 2015, total 14 pages.

3GPP TR 22.829 V17.1.0 (Sep. 2019), 3rd Generation Partnership Project; Technical Specification Group Services and System Aspects; Enhancement for Unmanned Aerial Vehicles; Stage 1 (Release 17), total 47 pages.

3GPP TS 37.355 V16.3.0 (Dec. 2020), 3rd Generation Partnership Project; Technical Specification Group Radio Access Network; LTE Positioning Protocol (LPP) (Release 16), total 298 pages.

3GPP TS 38.305 V16.3.0 (Dec. 2020), 3rd Generation Partnership Project; Technical Specification Group Radio Access Network; NG Radio Access Network (NG-RAN); Stage 2 functional specification of User Equipment (UE) positioning in NG-RAN (Release 16), total 118 pages.

NR Positioning Enhancements, 3GPP TSG RAN meeting #89e, RP-201780, Electronic Meeting, Sep. 14-18, 2020, total 20 pages.

3GPP TS 22.186 V16.2.0 (Jun. 2019), 3rd Generation Partnership Project; Technical Specification Group Services and System Aspects; Enhancement of 3GPP support for V2X scenarios; Stage 1 (Release 16), total 18 pages.

3GPP TR 38.901 V16.1.0 (Dec. 2019), 3rd Generation Partnership Project; Technical Specification Group Radio Access Network; Study on channel model for frequencies from 0.5 to 100 GHz (Release 16), total 101 pages.

LG Electronics, FirstNet, New SID: Study on scenarios and requirements of in-coverage, partial coverage, and out-of-coverage positioning use cases, 3GPP TSG RAN Meeting #88e, RP-201384, Electronic Meeting, Jun. 29-Jul. 3, 2020, total 4 pages.

International Search Report and Written Opinion issued in PCT/EP2021/056024, dated Nov. 10, 2021, 18 pages.

* cited by examiner

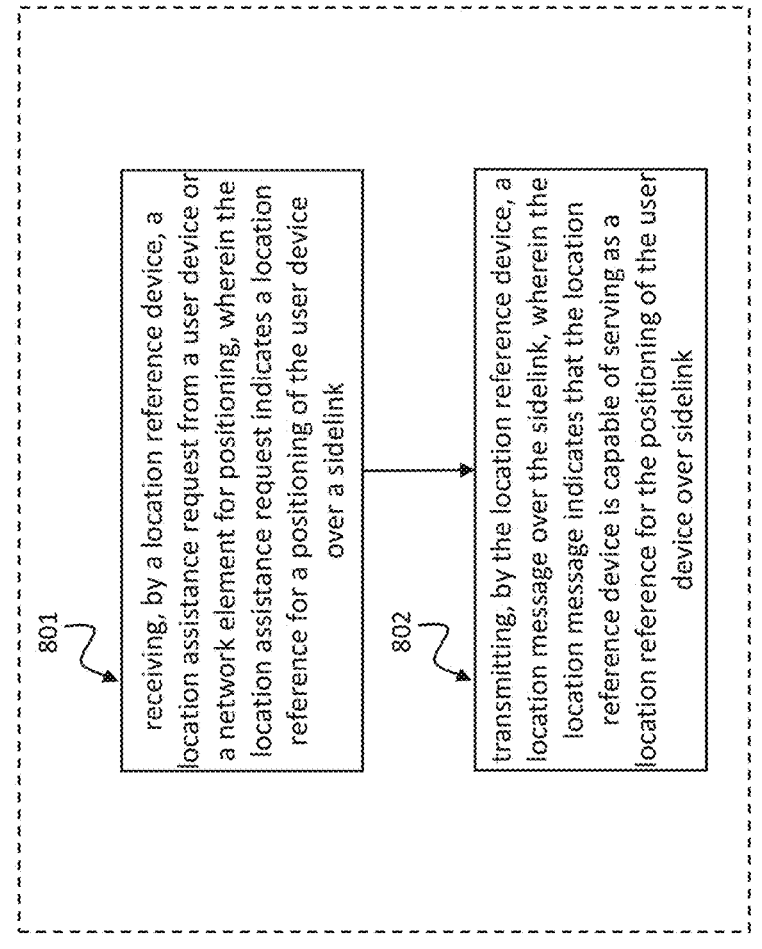

800

801 receiving, by a location reference device, a location assistance request from a user device or a network element for positioning, wherein the location assistance request indicates a location reference for a positioning of the user device over a sidelink

802 transmitting, by the location reference device, a location message over the sidelink, wherein the location message indicates that the location reference device is capable of serving as a location reference for the positioning of the user device over sidelink

Figure 8

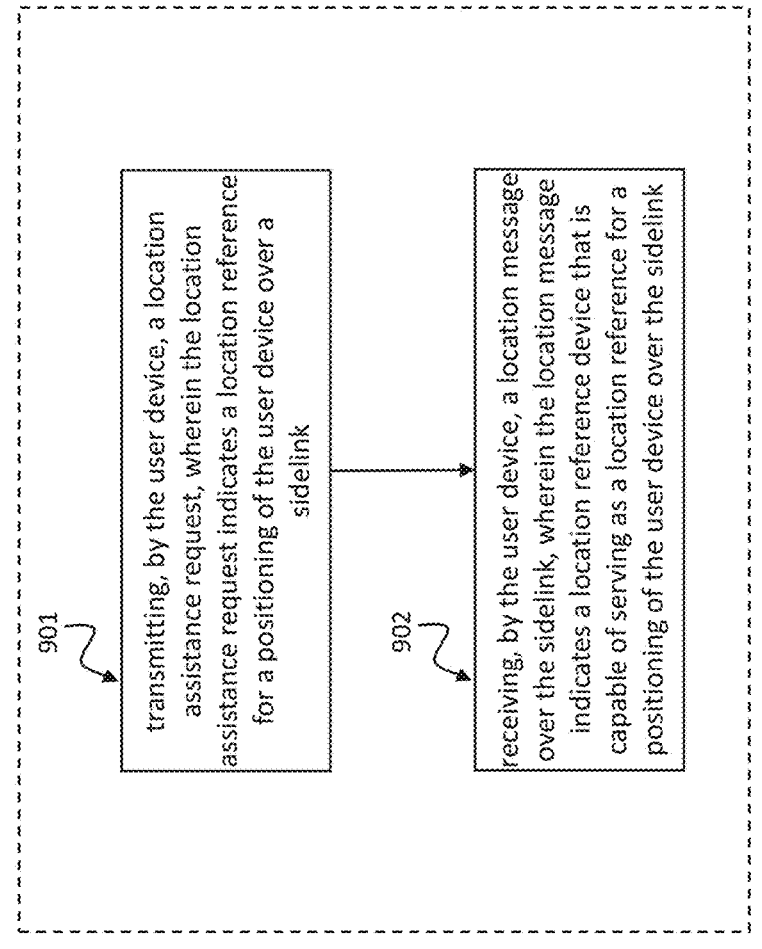

901 transmitting, by the user device, a location assistance request, wherein the location assistance request indicates a location reference for a positioning of the user device over a sidelink

902 receiving, by the user device, a location message over the sidelink, wherein the location message indicates a location reference device that is capable of serving as a location reference for a positioning of the user device over the sidelink

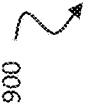

METHOD AND APPARATUS FOR ASSISTING POSITIONING OVER SIDELINK

CROSS-REFERENCE TO RELATED APPLICATIONS

This application is a continuation of International Application No. PCT/EP2021/056024, filed on Mar. 10, 2021, the disclosure of which is hereby incorporated by reference in its entirety.

TECHNICAL FIELD

The present disclosure relates to method and apparatus for assisting positioning over sidelink, in particular to a location reference device, a network element for positioning and corresponding methods for assisting positioning over sidelink. The disclosure particularly relates to positioning in indoor and factory environments.

BACKGROUND

In a factory environment, in particular in indoor factory scenarios, there are many static and mobile obstacles and clutter. Static reference points, such as fixed installed base stations (gNBs, eNBs) or transmit-receive-points (TRPs) are utilized as positioning reference nodes. However, TRP-to-UE (User Equipment) links in factory can experience severe shadowing and LOS (Line-of-Sight) obstruction resulting in non-LOS (None-Line-of-Sight) with corresponding performance degradation. Shadowing and NLOS is hard to predict due to mobility of both user devices, i.e. UEs and mobile obstacles. Shadowing and NLOS in factory create significant RSRP (Reference Signal Received Power) reduction and increased multipath effects resulting in increased positioning error.

SUMMARY

It is an objective of this disclosure to improve performance of positioning, in particular in the above described scenarios of factory environment.

A particular objective of this disclosure is to provide a concept for improving positioning accuracy to combat non-LOS and shadowing effects in above-described scenarios.

One or more of these objectives are achieved by the features of the independent claims. Further implementation forms are apparent from the dependent claims, the description and the figures.

A basic idea of this disclosure is to introduce two variants of location reference device (LRD) support for sidelink-assisted positioning, including detailed procedures for triggering and determination of LRDs. A first variant are free roaming LRDs. In this base solution the following functionality is specified: Interaction between LS, target user device, and LRD on when LRDs activate and support target user devices, depending on LRD location, channel condition user device-LRD, LRD primary function, and LRD capabilities. A second variant are instructed LRDs. In this extended solution the following functionality is specified: leveraging the network control of LRD routes in order to improve the user device positioning accuracy.

According to a first aspect, the disclosure relates to a LRD for assisting positioning over sidelink, the LRD comprising: a communication interface configured to: receive a location assistance request from a user device or a network element for positioning, wherein the location assistance request indicates a location reference for a positioning of the user device over a sidelink; and transmit a location message over the sidelink, wherein the location message indicates that the location reference device is capable of serving as a location reference for the positioning of the user device over sidelink.

A location message is a message transmitted by the LRD to other entities, e.g. user devices, which indicates that the location reference device is capable of serving as a location reference. The location message may be transmitted either once or periodically for a specific time duration. The location message can be a unicast message or a groupcast message or a broadcast message.

The LRD may be a Reference Point, i.e. a radio-equipped device with knowledge of its own position, e.g. a robot in factory. The LRD may particularly be a Mobile Reference Point (MRP), i.e. a radio-equipped mobile device with knowledge of its own position, e.g. a mobile robot in factory. The LRD may also be a base station or a network entity with knowledge of its own position.

Such an LRD improves performance of positioning, in particular in the scenarios of factory environment. Such LRD improves positioning accuracy to combat non-LOS and shadowing effects.

The LRD provides improved user device positioning, in particular in case of obstructed static reference points (e.g., due to severe shadowing and NLOS).

In an embodiment of the LRD, the location message comprises at least one of: location data indicating a current position of the LRD, an identifier of the LRD, a reference signal to enable determining a signal strength, a time stamp, an accuracy of the location reference, a confidence level of the location reference.

This provides the advantage that based on the information in this location message, the user device can efficiently check whether the LRD fulfills the positioning requirements of the user device and hence can be used as a location reference.

In an embodiment of the LRD, the location assistance request comprises at least one of: an identity of the user device, an identity of a geographic area or an identity of a zone where the user device is located, a desired accuracy of location estimate, a desired latency of the location reference, a desired characteristic of a positioning reference signal from the location reference, a desired reference signal receive power from the location reference, a distance of the LRD to a target location, a desired channel quality of a link from the LRD to the user device, positioning capabilities of the LRD, including at least one of: a number of supported antennas for positioning, a number of supported frequency layers for positioning, a supported bandwidth for positioning, maximum transmit power for positioning, battery constraints, positioning accuracy and a confidence level of positioning.

This provides the advantage that the LRD can efficiently check based on this information of the location assistance request if it is capable of serving the user device as a location reference.

In an embodiment of the LRD, the communication interface is configured to transmit the location message to the user device based on at least one of: a distance of the LRD to the user device, a priority of serving as a location reference for the user device, a positioning capability of the LRD, positioning data of the user device.

This provides the advantage that these information enable the LRD to decide whether it is capable of serving as a location reference for the user device.

In an embodiment of the LRD, the LRD comprises: a processor, configured to activate the LRD as a location reference based on the reception of the location assistance request from the user device and upon a decision to serve as a location reference for the positioning of the user device, wherein the decision to serve as a location reference is based on a predefined criterion, wherein the predefined criterion comprises at least one of: a distance of the LRD to the user device, a channel quality of a link between the LRD and the user device, a positioning capability of the LRD.

This provides the advantage that the LRD can efficiently activate its functionality as a location reference only upon requirement. This saves resources, in particular processing power.

The decision to serve as a location reference is an optional feature of the LRD. This decision may be a decision of the LRD on its own or a decision obtained from another entity, e.g. some management entity, e.g. a network entity.

In one example, the processor may be configured to activate the LRD as a location reference based on the reception of the location assistance request from the user device, which not depends on the above described decision.

In an embodiment of the LRD, the location assistance request comprises a move request, the move request instructing the LRD to move to a specific location or area.

Such a LRD may implement an instructed MRP. Instructed MRPs allow the network to control the number and density of reference points in a location, depending on the (radio channel) situation, thereby increasing the chance to find MRPs with good conditions.

In an embodiment of the LRD, the communication interface is configured to: transmit a response of the move request if the processor has determined that the LRD is capable of moving to the specific location or area.

This provides the advantage that based on the response, the network element can update a map of available LRDs and their corresponding location.

In an embodiment of the LRD, the communication interface is configured to report a failure message to the positioning network element if a movement failure of the LRD moving to the specific location or area has been detected.

This provides the advantage that the network element can update an availability and failure map for all available LRDs, for example in a factory environment.

According to a second aspect, the disclosure relates to a user device, the user device comprising: a communication interface, configured to: transmit a location assistance request, wherein the location assistance request indicates a location reference for a positioning of the user device over a sidelink; and receive a location message over the sidelink, wherein the location message indicates a LRD that is capable of serving as a location reference for a positioning of the user device over the sidelink.

Such a user device improves performance of positioning, in particular in the scenarios of factory environment. Such user device improves positioning accuracy to combat non-LOS and shadowing effects. The user device together with a LRD provides improved user device positioning, in particular in case of obstructed static reference points (e.g., due to severe shadowing and NLOS).

In an embodiment of the user device, the location message comprises at least one of: location data indicating a current position of the LRD, an identifier of the LRD, a reference signal to enable determining a signal strength, a time stamp, an accuracy of the location reference, a confidence level of the location reference.

This provides the advantage that based on the information in this location message, the user device can efficiently check whether the LRD fulfills its positioning requirements and thus can be used as a location reference.

In an embodiment of the user device, the location assistance request comprises at least one of: an identity of the user device, an identity of a geographic area or an identity of a zone where the user device is located, a desired accuracy of location estimate, a desired latency of the location reference, a desired characteristic of positioning reference signal from the location reference, a desired reference signal receive power from the location reference, a distance of the LRD to a target location, a desired channel quality of a link from the LRD to the user device, positioning capabilities of the LRD, including at least one of: a number of supported antennas for positioning, a number of supported frequency layers for positioning, a supported bandwidth for positioning, maximum transmit power for positioning, battery constraints, positioning accuracy and a confidence level of positioning.

This provides the advantage that the LRD can efficiently check based on this information of the location assistance request if it is capable of serving the user device as a location reference.

In an embodiment of the user device, the communication interface is configured to transmit the location assistance request based on a trigger condition.

This provides the advantage that the location assistance request is only transmitted if there are chances of success for finding a location reference.

In an embodiment of the user device, the trigger condition comprises at least one of: an accuracy of a location estimate of the user device is below a predetermined threshold, an accuracy of a location estimate of the user device is below a threshold that depends on a confidence level, a time stamp of the location estimate is beyond a pre-defined timing window.

This provides the advantage that multiple requirements to the location reference can be efficiently signaled.

In an embodiment of the user device, the communication interface is configured to select the LRD as location reference based on a predefined criterion.

This provides the advantage that the user device can efficiently select from one or more location references to find an optimal location reference.

In an embodiment of the user device, the predefined criterion is based on a quality of a link between the user device and the LRD.

This provides the advantage that high QoS can be supported for the link, resulting in efficient message transmission.

According to a third aspect, the disclosure relates to a network element for positioning, the network element comprising: a communication interface, configured to: transmit a request to a LRD based on location data of the LRD stored in the network element, wherein the request instructs the LRD to transmit a location message, wherein the location message indicates that the LRD is capable of serving as a location reference for a positioning of the user device over sidelink; and receive a response on a request to a user device requesting the user device to transmit a location assistance request, wherein the location assistance request indicates a location reference for a positioning of the user device over a sidelink.

Such a network element improves performance of positioning, in particular in the scenarios of factory environment. The network element for positioning improves positioning accuracy to combat non-LOS and shadowing effects. The network element can enable improved user device positioning between LRD and user device, in particular in case of obstructed static reference points (e.g., due to severe shadowing and NLOS).

In an embodiment of the network element, the request to the LRD or the user device comprises at least one of: an identity of the user device, an identity of a geographic area or an identity of a zone where the user device is located, a desired accuracy of location estimate, a desired latency of the location reference, a desired characteristic of positioning reference signal from the location reference, a desired reference signal receive power from the location reference, a distance of the LRD to a target location, a desired channel quality of a link from the LRD to the user device, positioning capabilities of the LRD, including at least one of: a number of supported antennas for positioning, a number of supported frequency layers for positioning, a supported bandwidth for positioning, maximum transmit power for positioning, battery constraints, positioning accuracy and a confidence level of positioning.

This provides the advantage that the LRD can efficiently check based on this information of the location assistance request if it is capable of serving the user device as a location reference.

In an embodiment of the network element, the request to the user device instructs the user device to transmit the location assistance request as a broadcast message or as a groupcast message.

This provides the advantage that the user device can efficiently transmit its location assistance request to multiple LRDs in order to find an optimum LRD.

In an embodiment of the network element, the communication interface is configured to transmit the request to the LRD or the user device based on a trigger condition.

This provides the advantage that the location assistance request is only transmitted if there are chances of success for finding a location reference.

In an embodiment of the network element, the trigger condition comprises at least one of: an accuracy of a location estimate of the user device is below a predetermined threshold, an accuracy of a location estimate of the user device is below a threshold that depends on a confidence level, a time stamp of the location estimate is beyond a pre-defined timing window.

This provides the advantage that multiple requirements to the location reference can be efficiently signaled.

The location estimate of the user device may be determined based on measurements and/or other assistance information transferred from either the user device or another network entity.

This provides the advantage that an accuracy of the location estimate can be increased.

In an embodiment of the network element, the communication interface is configured to transmit a move request to the LRD based on the location data of the LRD, wherein the move request instructs the LRD to move to a specific location or area.

Such a LRD that is able to move upon network request may implement an instructed MRP. Instructed MRPs allow the network to control the number and density of reference points in a location, depending on the (radio channel) situation, thereby increasing the chance to find MRPs with good conditions.

The move request may be a separate message transmitted individually. For example, the move request may be transmitted prior to the location assistance request or after the location assistance request. The move request may also be transmitted at a different time than the location assistance request.

In one embodiment, the move request may be included in the location assistance request, for example as an element of this message.

In an embodiment of the network element, the move request is based on a predefined criterion, wherein the predefined criterion comprises at least one of: a number of user devices within the specific location or area requesting support of the LRD as a location reference; a density of obstacles between a current position of the LRD and the specific location or area; a distance between the current position of the LRD and the specific location or area; a value indicating a strictness of the location assistance request for the user device.

This provides the advantage that the most adequate LRD can be instructed to move nearby the user device for serving as a location reference.

According to a fourth aspect, the disclosure relates to a method for assisting positioning over sidelink, the method comprising: receiving, by a LRD, a location assistance request from a user device or a network element for positioning, wherein the location assistance request indicates a location reference for a positioning of the user device over a sidelink; and transmitting, by the LRD, a location message over the sidelink, wherein the location message indicates that the LRD is capable of serving as a location reference for the positioning of the user device over sidelink.

Such a method improves performance of positioning, in particular in the scenarios of factory environment. The method improves positioning accuracy to combat non-LOS and shadowing effects.

According to a fifth aspect, the disclosure relates to a method for requesting a location reference for positioning of a user device, the method comprising: transmitting, by the user device, a location assistance request, wherein the location assistance request indicates a location reference for a positioning of the user device over a sidelink; and receiving, by the user device, a location message over the sidelink, wherein the location message indicates a LRD that is capable of serving as a location reference for a positioning of the user device over the sidelink.

Such a method provides improved user device positioning, in particular in case of obstructed static reference points (e.g., due to severe shadowing and NLOS).

According to a sixth aspect, the disclosure relates to a computer program product including computer executable code or computer executable instructions that, when executed, causes at least one computer to execute the method according to the fourth or fifth aspect.

The computer program product may run on any of the components of a communication system described below with respect to FIG. 7. For example, the computer program product may run on a LRD 701a as shown in FIG. 7. Such a LRD may comprise a processing circuitry 703a for instance, a processor 703a, for processing and generating data, e.g. the program code described above, a transceiver 705a, including, for instance, an transmitter, a receiver and an antenna, for exchanging data with the other components of the communication system 700, and a non-transitory memory 707a for storing data, e.g. the program code described above. The computer program product may also run on a user device 701b as shown in FIG. 7. Such a user device may comprises a processing circuitry 703b for instance, a processor 703b, for processing and generating data, e.g. the program code described above, a transceiver 705*b*, including, for instance, an transmitter, a receiver and an antenna, for exchanging data with the other components of the communication system 700, and a non-transitory memory 707*b* for storing data, e.g. the program code described above. The computer program product may also run on a network device for positioning, e.g. a base station 710 or another network element 720, e.g. a location server as shown in FIG. 7.

According to a seventh aspect, the disclosure relates to a computer-readable medium, storing instructions that, when executed by a computer, cause the computer to execute the method according to the fourth or fifth aspect. Such a computer readable medium may be a non-transient readable storage medium. The computer may be, for example, a user device, e.g. the user device according to the second aspect comprising a processor, a transceiver and a memory as shown in FIG. 7. The computer-readable medium may be stored in the memory of the user device. The instructions stored on the computer-readable medium may be executed by the processor of the user device. The computer may be, for example, a LRD, e.g. the LRD according to the first aspect comprising a processor, a transceiver and a memory as shown in FIG. 7. The computer-readable medium may be stored in the memory of the LRD. The instructions stored on the computer-readable medium may be executed by the processor of the LRD. The computer may also be implemented by, for example, a network device for positioning, e.g. a base station 710 or another network element 720, e.g. a location server as shown in FIG. 7. For example, the computer may be the processor 713, 723 of the entities 710, 720 shown in FIG. 7.

BRIEF DESCRIPTION OF THE DRAWINGS

Further embodiments of the disclosure will be described with respect to the following figures, in which:

FIG. 8 shows a schematic diagram illustrating an example method 800 for assisting positioning over sidelink according to an embodiment of the disclosure; and FIG. 9 shows a schematic diagram illustrating an example method 900 for requesting a location reference for positioning of a user device according to an embodiment of the disclosure.

DETAILED DESCRIPTION OF EMBODIMENTS

Figure 1:
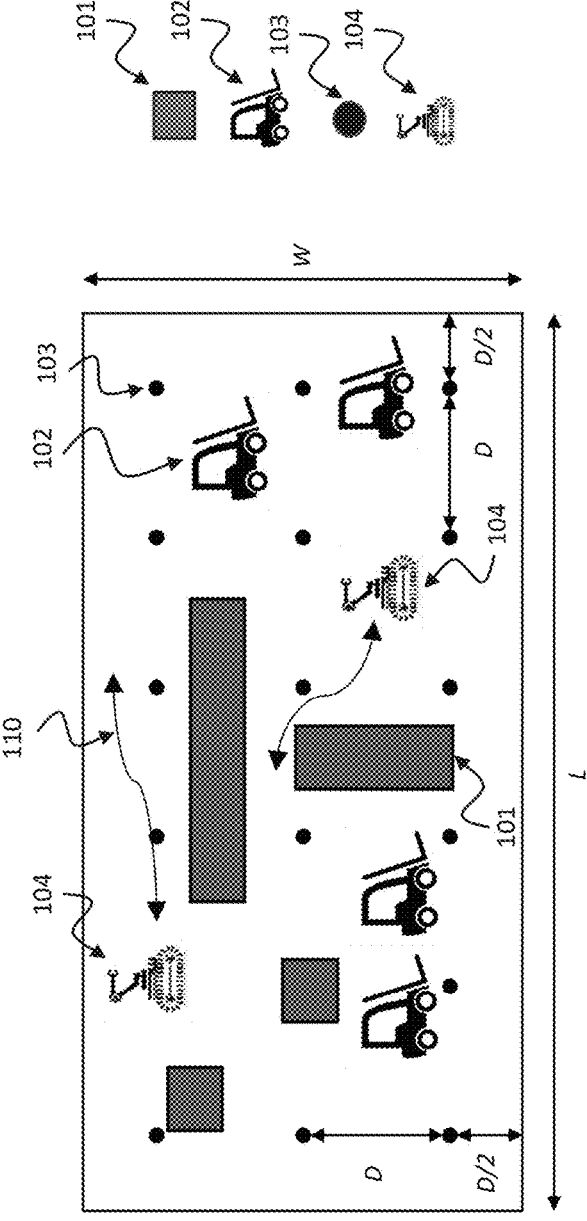
FIG. 1 shows a schematic diagram illustrating an example factory environment 100 for illustrating the concept of Mobile Reference Points according to an embodiment of the disclosure.
Figure 1:

In order to describe the invention in detail, the following terms, abbreviations and notations will be used:
MRP mobile reference point
UE user equipment
RAT radio access technology
LTE long term evolution
LRD location reference device
NR new radio
TRP transmit-receive point
SL sidelink
RS reference signal
PRS positioning reference signal
RSRP reference signal received power
LOS Line-of-sight
NLOS None Line-of-sight
ID identity
QoS quality-of-service
LMF location management function
LPP LTE positioning protocol
AMF access and mobility management function (entity)
NRPPa new radio positioning protocol annex
RSU road side unit
NB node B
NB evolved NB
gNB next generation NB In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods, devices and systems described herein may be implemented in radio network, in particular LTE, 5G, or 5G beyond. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender). However, devices described herein are not limited to transmit and/or receive radio signals, also other signals designed for transmission in deterministic communication networks may be transmitted and/or received.

The devices and systems described herein may include processors or processing devices, memories and transceivers, i.e. transmitters and/or receivers. The term "processor" or "processing device" describes any device that can be utilized for processing specific tasks (or blocks or steps). A processor or processing device can be a single processor or a multi-core processor or can include a set of processors or can include means for processing. A processor or processing device can process software or firmware or applications etc.

The devices and systems described herein may include transceivers or transceiver devices. A transceiver is a device that is able to both transmit and receive information or signal through a transmission medium, e.g. a radio channel. It is a combination of a transmitter and a receiver, hence the name transceiver. Transmission is usually accomplished via radio waves. By combining a receiver and transmitter in one consolidated device, a transceiver allows for greater flexibility than what either of these could provide individually.

In the present disclosure, the user device may be, for example, a mobile phone, an intelligent terminal, a tablet computer (tablet), a notebook computer (laptop), a video game console, a multimedia player, vehicle, device to device (D2D) equipment, or any smart device which supports a positioning function. The user device may also be referred to as user equipment (UE) in some embodiments of the present disclosure.

In the present disclosure, the LRD may be, for example, a mobile reference point (MRP), i.e. a radio-equipped mobile device with knowledge of its own position, e.g. robot in factory. In another example, the LRD may be a static or semi-mobile reference point, i.e. a radio-equipped device with knowledge of its own position. The LRD may also be, for example, a mobile device with knowledge of its own position, e.g. a mobile phone, an intelligent terminal, a tablet computer (tablet), a notebook computer (laptop), a video game console, a multimedia player, vehicle, device to device (D2D) equipment, or any smart device which has knowledge of its own position and supports a positioning function.

In the present disclosure, assisting positioning over sidelink is presented. Sidelink is defined as a communication paradigm in which two user devices are communicating without traversing any network node, applying to various services such as in V2X, public safety, and/or internet of things (IOT) services. Specifically, user device's positioning is performed based on sidelink measurements for these RAT-dependent sidelink positioning methods, while sidelink is exploited for the transmission/reception of reference signals.

A LRD is provided in the present disclosure. The LRD for assisting positioning over sidelink, the LRD comprising: a communication interface configured to: receive a location assistance request from a user device or a network element for positioning, wherein the location assistance request indicates a location reference for a positioning of the user device over a sidelink; and transmit a location message over the sidelink, wherein the location message indicates that the LRD is capable of serving as a location reference for the positioning of the user device over sidelink.

The LRD may comprise: a processor configured to activate the LRD as a location reference based on the reception of the location assistance request from the user device and/or upon a decision to serve as a location reference for the positioning of the user device.

The LRD may be a mobile device in some embodiments, or the LRD may be a fixed device in some embodiments.

FIG. 1 shows a schematic diagram illustrating an example factory environment 100 for illustrating the concept of Mobile Reference Points according to an embodiment of the disclosure. The factory environment 100 has a length of L and a width of W. Static reference points 103 are arranged on a grid throughout the factory. These static reference points 103 have a distance D with respect to each other. The static reference points nearest to the borders of the factory have a distance D/2 with respect to the borders of the factory. In the factory environment 100 static obstacles 101 are placed and mobile obstacles 102, e.g. lift trucks are moving through the factory 100. Mobile reference points (MRP) 104, i.e. radio-equipped mobile devices with knowledge of their own position, e.g. robots, can move through routes 110 in the factory environment 100.

A concept presented in this disclosure is to leverage the concept of Mobile Reference Points as described in the following. MRP can provide reference when in known positions, i.e., MRP does not need to know its own position all time. MRP can provide reference service only upon request/on-demand, i.e., if static reference points are shadowed or in NLOS. MRP can move to the target user device's vicinity either autonomously or under instruction to assist positioning.

MRPs according to the disclosure result in more dynamic LOS opportunities with user devices and are in particular helpful in case of dense clutter/obstacles, either mobile or static, that obstruct static reference points.

The following regarding MRPs is assumed. 1) static reference points exist, and MRPs assist them, i.e., MRPs are not stand-alone solution. 2) MRPs can have another, primary function unrelated to positioning, e.g., AGV, robot, etc., and in this case, MRPs provide position assistance when it does not interfere with that primary function.

In this disclosure, two types of MRP are presented: I) Free-roaming MRPs (basic solution) and II) Instructed MRPs (advanced solution). In the following, the details of the two MRP types are explained along with detailing the procedures for their inclusion in existing positioning solutions in vertical industry scenarios, with examples for industrial IoT.

Figure 2:
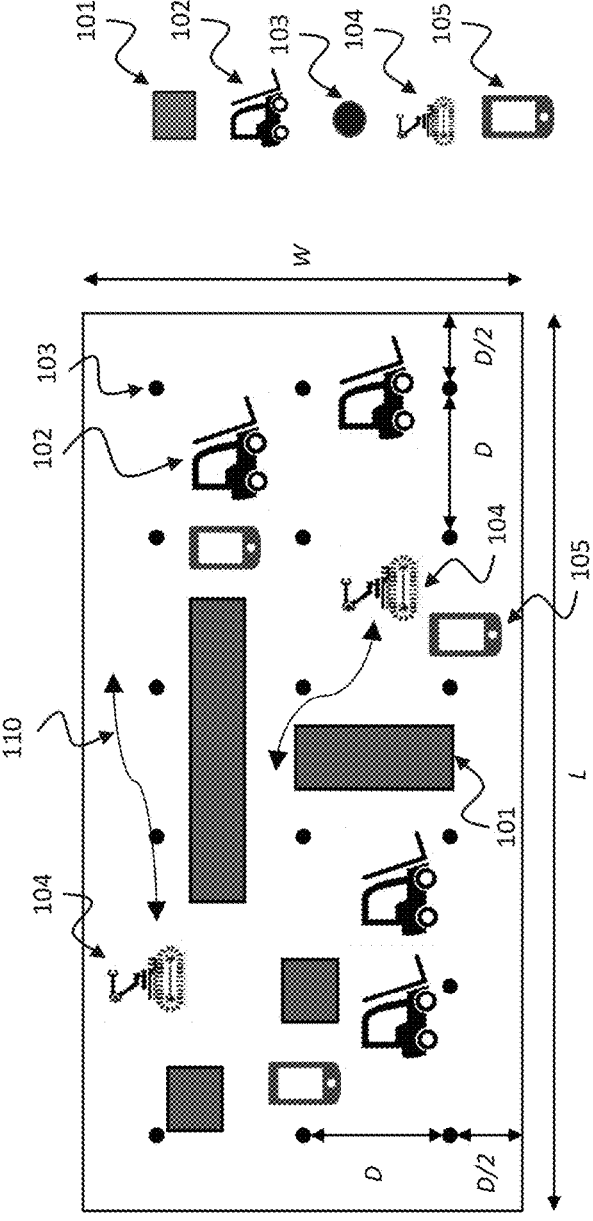
FIG. 2 shows a schematic diagram illustrating an example factory environment 200 for illustrating the concept of free-roaming Mobile Reference Points according to an embodiment of the disclosure.
Figure 2:

FIG. 2 shows a schematic diagram illustrating an example factory environment 200 for illustrating the concept of free-roaming Mobile Reference Points according to an embodiment of the disclosure. The factory environment 200 corresponds to the factory environment 100 shown in FIG. 1, including static reference points 103, static obstacles 101, mobile obstacles 102 and MRPs 104. Besides, user devices 105 are arranged in the factory environment 200, e.g. used by mobile users. These user devices 105 may have good channel conditions, i.e. LOS or bad channel conditions, i.e. none-LOS with the MRPs 104.

In this disclosure, MRPs 104 may also be referred to as LRDs 104. UEs may also be referred to as user devices.

In the basic solution as shown in FIG. 2, free-roaming MRPs 104 may be activated when they are available with good knowledge of their own position and with good channel to user device 105.

MRPs 104 may be available when they are located near user device 105. MRPs 104 may have good knowledge of their own positions during battery charging or when they have high-precision sensors such as LIDAR or others. MRPs 104 may have good channel when they are in LOS to user device 105.

Free roaming MRP 104 may move along the routes 110 irrespective of their reference point function (i.e., network does not influence their mobility). This implies that the primary function of the MRP 104, which can be of different type (e.g., in case of an automated forklift, a carrying an object from one to another point in factory), takes precedence and needs to be included as part of the procedure for selection of MRP(s) 104.

Figure 3:
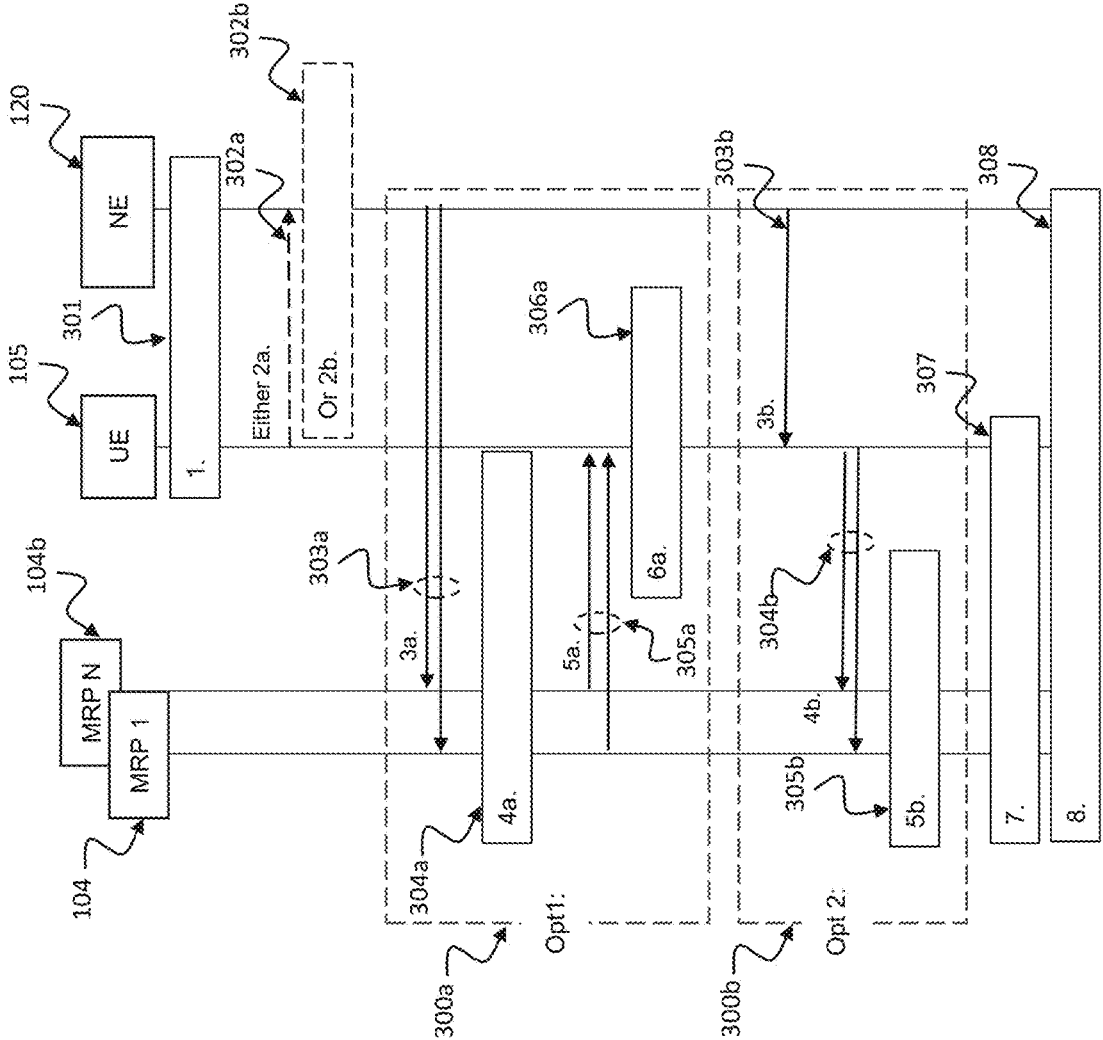
FIG. 3 shows an exemplary message sequence diagram 300 illustrating an example signaling procedure for free-roaming Mobile Reference Points according to an embodiment of the disclosure.
Figure 3:

FIG. 3 shows an exemplary message sequence diagram 300 illustrating a detailed signaling procedure for free-roaming Mobile Reference Points according to an embodiment of the disclosure. This detailed signaling procedure may correspond to the basic solution mentioned above.

The signaling may be between one or more MRPs 104, 104b, a user device 105 or UE, respectively, and a network element 120, for example a location server. This network element 120 may be located in a network entity of the core network or in a network entity of the radio access network (RAN), e.g. a base station or an AMF.

Each step of the signaling procedure is detailed as follows:

Step 1 ("standard positioning procedure per TS 38.305", 301): Legacy user device-assisted or user device-based positioning procedures (e.g., according to 3GPP TS 38.305) may be performed between the target user device 105 and static reference point, e.g., fixed eNB/gNB/TRP/RSU. This positioning procedure may be triggered by location request with certain location QoS quality, including accuracy and response time. An operation in which measurements are provided by the user device 105 to the location server 120 to be used in the computation of a position estimate is described as "user device-assisted" (and could also be called "network-based"), while one in which the user device 105 computes its own position is described as "user device-based or UE-based".

Step 2 (302a, 302b): Triggering MRP's assistance: There are two options (Option 1 and Option 2) for this step, a first option is to perform Step 2a (302a) and a second option is to perform step 2b (302b).

Step 2a ("LPP Provide Location Information (Location estimation accuracy)", 302a) according to Option 1. For the user device-based positioning, the location estimate may be computed at the user device 105. Then user device 105 may need to report the location estimate (e.g., latitude/longitude/altitude) with uncertainty shape (e.g., HighAccuracyEllipsoidPointWithUncertaintyEllipse per 3GPP TS 37.355), and/or a time stamp of location estimate to the location server 120. The location server 120 then may determine the positioning accuracy (as part of the location QoS) and/or its confidence level.

Step 2b ("Determines the location estimation accuracy", 302b) according to Option 2. For the user device-assisted/network-based positioning, the location server 120 (e.g., LMF or RAN) may derive the location estimate accuracy and/or a confidence level of the user device 105 based on measurements and/or other assistance information transferred from either the RAN or the user device 105.

Trigger conditions could cover one or more cases as follows:

(i) When the derived location estimate accuracy of current location estimate is below the requested location accuracy inside requested position QoS;

(ii) When the derived location estimate accuracy of current location estimate is below the requested location accuracy inside requested position QoS+offset margin by considering the confidence level;

(iii) When the time stamp of location estimate is beyond some pre-defined timing window (e.g., may indicate the location estimate coming from NLOS path(s) which is deemed to be erroneous;

(iv) Non-condition.

Note that this location estimate accuracy may be based on static reference points only, which means when the positioning accuracy obtained from static reference points is insufficient, mobile reference points are used.

For determination of MRP(s) 104, 104b for the target user device 105 there are the two options (Option 1 and Option 2) as described above:

Option 1 ("Select MRP(s) based on MRP(s)' signals" 300a): The target user device 105 may select MRP(s) 104, 104b based on MRP(s) signals:

Step 3a ("Request MRPs to provide positioning (with e.g., zone-ID and/or Target-UE-ID)", 303a): Location server 120 requests MRP's 104, 104b assistance based on either: i) specific user device's location estimate accuracy obtained from positioning results with the help of static reference points, along with TargetUEInfo (e.g., Target-UE-ID, TargetUE positioning requirement, TargetUE-PRS requirement (optional) etc.); or ii) an area (zone-ID) where MRP's assistance is needed. Detailed explanation of parameters are as follows:

TargetUEInfo: Information of positioning user device 105:

Target-UE-ID: user device identifier for the user device whose position is required to be computed;

TargetUE-positioning-requirement: positioning requirement in terms of location QoS (e.g., accuracy, positioning latency) of the target user device;

TargetUE-PRS requirement: positioning reference signal requirements of target user device;

Zone-ID: Identifier of zone where user device is located.

Step 4a ("Decides whether to send own location information based on (pre-) configured criteria" 304a): MRP(s) 104, 104b may determine whether to send current location and its accuracy and/or reference signals to user device(s) 105 in the vicinity, depending on (pre-) configured criteria. The criteria can be related to:

distance to target user device: target user device's (rough) location may be obtained based on the zone-ID in pre-defined zone grid. Distance to target user device may be calculated based on the MRP's own position and this user device's rough location.

MRP's own primary function: MRP's primary function can be serving inside the factory site, communication, assistance for positioning. Whether MRP will offer the positioning assistance depends on the fulfilment of primary function as a higher priority.

MRP's own positioning capability: The positioning capability of MRP 104, 104b, including the number of supported antennas for positioning, the number of supported frequency layer/bandwidth for positioning, the maximum transmission power, the battery constraints, and its own positioning accuracy and a confidence level.

(optionally) TargetUEInfo as abovementioned.

Step 5a ("Current MRP(s) location" 305a): MRP(s) 104, 104b may send its current location information (optionally with additional information, e.g., accuracy, an uncertainty shape, a confidence level, a time-stamp) to the target user device 105.

Step 6a ("UE selects MRP(s)" 306a): Target user device 105 may select MRP(s) 104, 104b depending on the quality of link to MRP(s), wherein the quality indication includes RSRP and/or Time of flight (if MRP adds timestamp to the advertisement)

Option 2 ("Activate MRP(s) based on UE's signals" 300b): MRP(s) 104, 104b may activate themselves based on received signals from the target user device 105:

Step 3*b* ("Request UE to broadcast or groupcast calling for positioning assistance by MRPs (e.g., Target-UE-ID)" 303*b*): Location server 120 may request the target user device 105 to broadcasts/groupcast signals calling for positioning assistance by mobile ref. points 104, 104*b*.

Step 4*b* ("UE broadcasts or groupcasts calling for positioning assistance by MRPs via sidelink" 304*b*): user device 105 may broadcast or groupcast the request asking for assistance via sidelink (e.g., similar to discovery signal)

Step 5*b* ("Decides whether to activate as the MRP(s)" 305*b*): MRP(s) 104, 104*b* may decide to serve as positioning reference point based on measured RSRP from the target user device 105 and (pre-) configured criteria. The pre-configured criteria can be one or more conditions as following:

distance of MRP 104, 104*b* to the location where the user device(s) requiring support are smaller than a pre-defined threshold, wherein the location of target user device 105 is obtained based on an area ID (e.g. zone ID) and the location of MRPs 104, 104*b* is assumed to be available at the MRP 104, 104*b* itself or location server 120.

channel quality of link from MRP 104, 104*b* to the target user device 105 is better than some pre-defined threshold, e.g., based on RSRP and/or time-of-flight if time-stamp is indicated by the user device 105 wherein the quality indication includes RSRP and/or Time of flight.

MRP's 104, 104*b* own positioning capability: The positioning capability of MRP, including the number of supported antennas for positioning, the number of supported frequency layer/bandwidth for positioning, the maximum tx power, the battery constraints, and its own positioning accuracy and a confidence level.

Step 7 ("Performing sidelink positioning" 307): Performing sidelink positioning between MRP(s) 104, 104*b* and the user device 105.

Step 8 ("Update information of MRP(s), optionally trigger the reselection of MRP(s)" 308): Meanwhile MRP(s) 104, 104*b* updates its information relevant to positioning with the target user device 105 and/or LS 120, which may trigger the reselection of MRP(s) 104, 104*b*.

Figure 4:
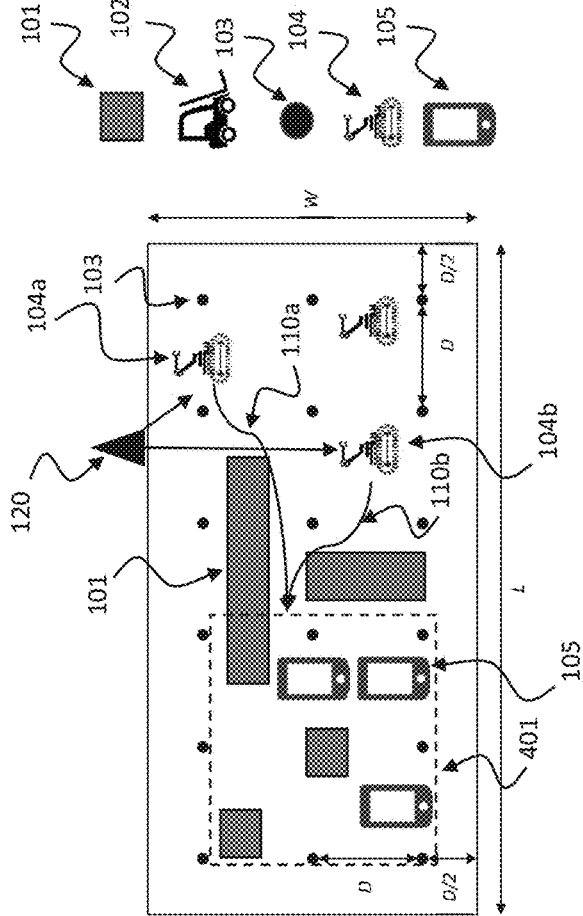
FIG. 4 shows a schematic diagram illustrating an example factory environment 400 for illustrating the concept of instructed Mobile Reference Points according to an embodiment of the disclosure.
Figure 4:

FIG. 4 shows a schematic diagram illustrating an example factory environment 400 for illustrating the concept of instructed Mobile Reference Points according to an embodiment of the disclosure.

The factory environment 400 may correspond to the factory environment 200 shown in FIG. 2, including static reference points 103, static obstacles 101, mobile obstacles 102, MRPs 104 and user devices 105. Besides, a network element 120, e.g. a base station or any other network node as described above may be arranged in the vicinity of the factory environment 400. This network element 120 can be used for instructing the MRP(s) 104.

Figure 5:
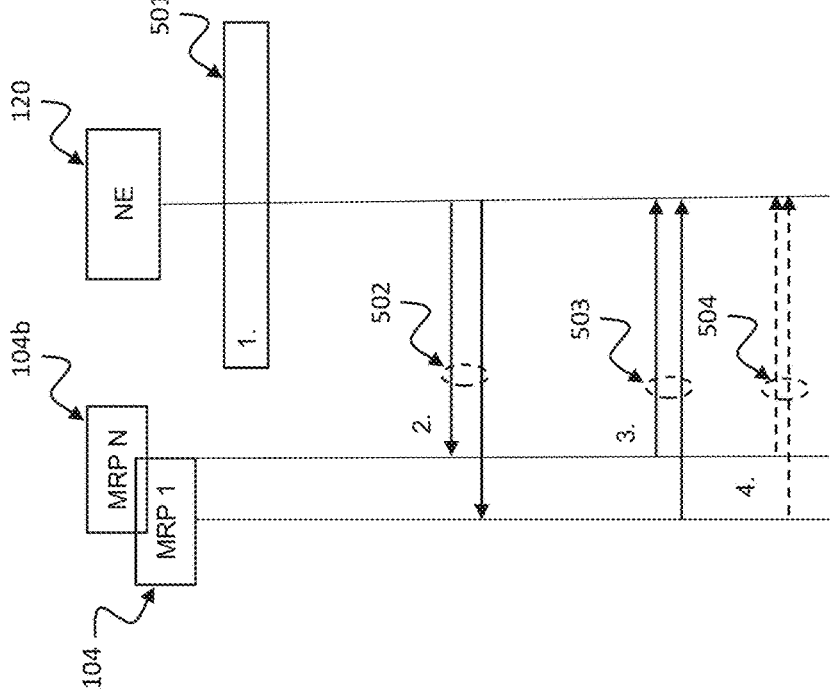
FIG. 5 shows an exemplary message sequence diagram 500 illustrating a detailed signaling procedure for instructed Mobile Reference Points according to an embodiment of the disclosure.
Figure 5:

Instructed MRPs according to the advanced solution described with respect to FIGS. 4 and 5 have the following properties:

MRP route and position may be determined by network so it increases their value as reference points.

Network may determine the route/position. E.g., if large number of user devices have low positioning accuracy in an area, MRPs may be instructed to go there.

Despite the network determining their route and position, the MRPs 104 may still have a primary function that needs to be accounted for when defining the MRP selection procedure.

A signaling procedure for this advanced solution of instructed MRPs shown in FIG. 4 is presented in the following.

FIG. 5 shows an exemplary message sequence diagram 500 illustrating a detailed signaling procedure for instructed Mobile Reference Points according to an embodiment the disclosure.

This detailed signaling procedure corresponds to the advanced solution mentioned above.

The signaling may be between one or more MRPs 104, 104*b* and a network element 120. These entities correspond to the MRPs 104, 104*b* and a network element 120 as described above with respect to FIG. 3.

As described above, MRPs 104, 104*b* can be instructed by the network to move to a specific location or area for the purpose of assisting one or more user devices that need better positioning accuracy. The detailed procedures for instructed MRPs 104, 104*b* may be similar to that of free-roaming MRP(s) described above with respect to FIG. 3 apart from adding additional message exchange between location server 120 (e.g., gNB, LMF) and MRPs 104, 104*b* (i.e., between step 2*a*/2*b* and step 3*a*/3*b* in FIG. 3).

Each step of the signaling procedure is detailed as follows:

Step 1 ("Determine the move request (candidate MRPs, route) depends on e.g., UE density, obstacles, distance MRP-UE" 501): Determine whether to initiate the move request. The triggering conditions for initiating the move request can be any of the following or their combinations:

i) Condition depending on the number of user devices in that area that have requested MRP support (in step 2*a* of FIG. 3, 302*a*) or its positioning accuracy has been determined by the location server 120 as "insufficient" (in step 2*b* of FIG. 3, 302*b*) (e.g., if the number of user devices 105 requiring MRP support is above a specified threshold, initiate MRP move request.

ii) Condition depending on density of obstacles around user devices: when the area around one or more user devices 105 contains large number of obstructing objects—determined either through map information, active sensing; This determination can be implemented at the user device side or the network side. When determination is at the user device side, indication of status "dense obstacles" may be signaled from the user device 105 to the LMF 120 via a LPP message. When determination is at the network side, indication of status "dense obstacles" is signaled from the base station to the LMF via NRPPa message. Note that in case of the network side determination, an external application layer (e.g., an application server) can be the entity that performs the determination. In this case, the external application can provide the information either to LMF another entity (e.g., AMF).

iii) distance of potential MRP 104, 104*b* to the location where the user device(s) requiring support may be smaller than a pre-defined threshold (e.g., initiate MRP move request for the MRP that is closest to the user device 105), wherein the location of target user device 105 may be obtained based on an area ID (e.g. zone ID) and the location of MRPs 104, 104*b* may be assumed to be available at the location server 120.

iv) The positioning requirement on a target user device 105 may be changed to be more stringent (e.g., if the application requirements on positioning on the user device become more stringent, initiate MRP move request). The change of positioning requirement may be implemented as the legacy procedure of location request with requirement change. The request can come from the external client demanding positioning, network, or the user device side.

Step 2 ("Move request (route/location info, zone-ID, Target UE Info" 502): Signaling from location server 120 to MRP 104, 104b to indicate which location/area to go to, i.e., instruction can be for either a specific location or an area/ quadrant with zone-ID, optionally with TargetUEInfo (TargetUE positioning requirement, PRS requirement, etc.) so that MRP(s) 104, 104b checks against its own capability.

Step 3 ("OK/NOK based on ability to move to area (depending on path availability, other tasks)" 503): Each MRP 104, 104b may confirm whether it will move as instructed based on its ability and availability (If MRP 104, 104b decides to confirm, steps 3a and 4a in FIG. 3 are not needed).

Step 4 ("In case of movement failure, report to LS" 504): MRP(s) 104, 104b may report the failure of moving if it agreed with OK in step 3 but does not manage to move as instructed (e.g., due to a blocked path).

Figure 6:
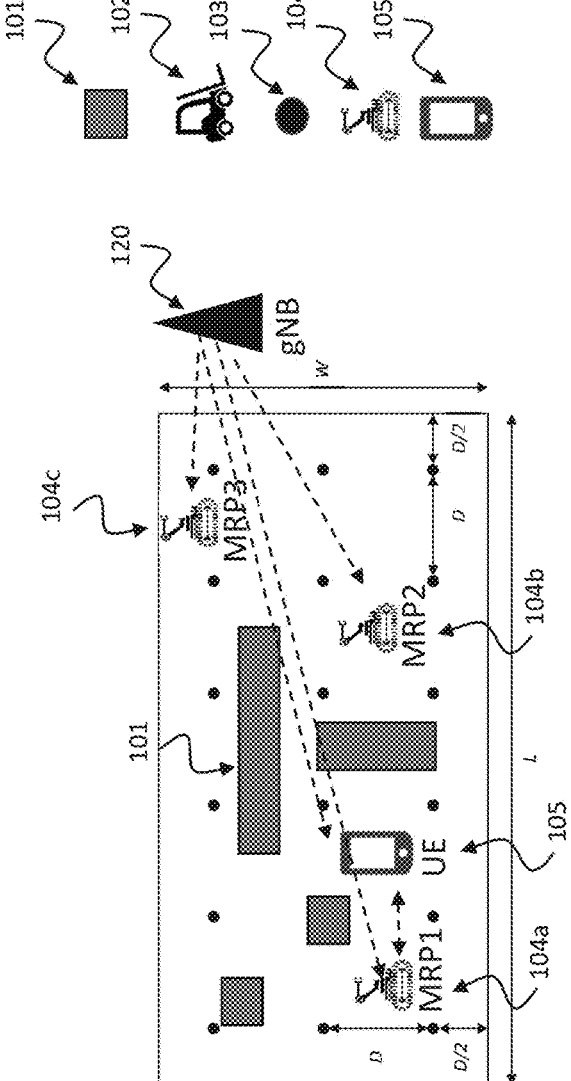
FIG. 6 shows a schematic diagram illustrating an example factory environment 600 for illustrating the concept of free-roaming Mobile Reference Points according to an exemplary embodiment.
Figure 6:

FIG. 6 shows a schematic diagram illustrating a factory environment 600 for illustrating the concept of free-roaming Mobile Reference Points according to an exemplary embodiment.

The factory environment 600 may correspond to the factory environment 200 shown in FIG. 2, including static reference points 103, static obstacles 101, mobile obstacles 102, MRPs 104, 104a, 104b, 104c and user devices 105. A network element 120, e.g. a base station or any other network node as described above may be arranged in the vicinity of the factory environment 600. This network element 120 can be used for instructing the MRP(s) 104a, 104b, 104c and connecting the user device 105.

In this exemplary embodiment, the following steps may be performed:

1) Location server 120 may start legacy positioning procedures with static reference point (e.g., fixed eNB/ gNB/TRP/RSU) for a user device 105.

2) Location server 120 may determine that estimated accuracy of user device position is insufficient (e.g., a high level of LOS obstruction between static reference points and user device in case of cluttered factory floor).

3) Location server 120 may request assistance of MRP1, MRP2, and MRP3 (104a, 104b, 104c).

4) For example, two MRPs 104a, 104b may decide to send reply: MRP1 is at a charging point and knows accurately its own position while it is there (e.g., next 30 minutes); MRP2 has LIDAR-guided and map navigation and knows its position with high accuracy all the time; MRP3 is too far away from user device 105 to provide assistance, so it does not reply.

5) MRP1 and MRP2 may send current location information with accuracy and (optionally) the duration they expect to provide support (e.g., MRP1: 30 min; MRP2: indefinitely).

6) user device 105 may select MRP1 for assistance. user device 105 does not select MRP2 due to bad signal blocked by, e.g., walls.

7) MRP1 assists user device 105 positioning through sidelink.

8) When fully charged, MRP1 may inform the user device 105 that it will move and its position accuracy will degrade. Upon this information, user device 105 stops using MRP1 assistance.

Figure 7:
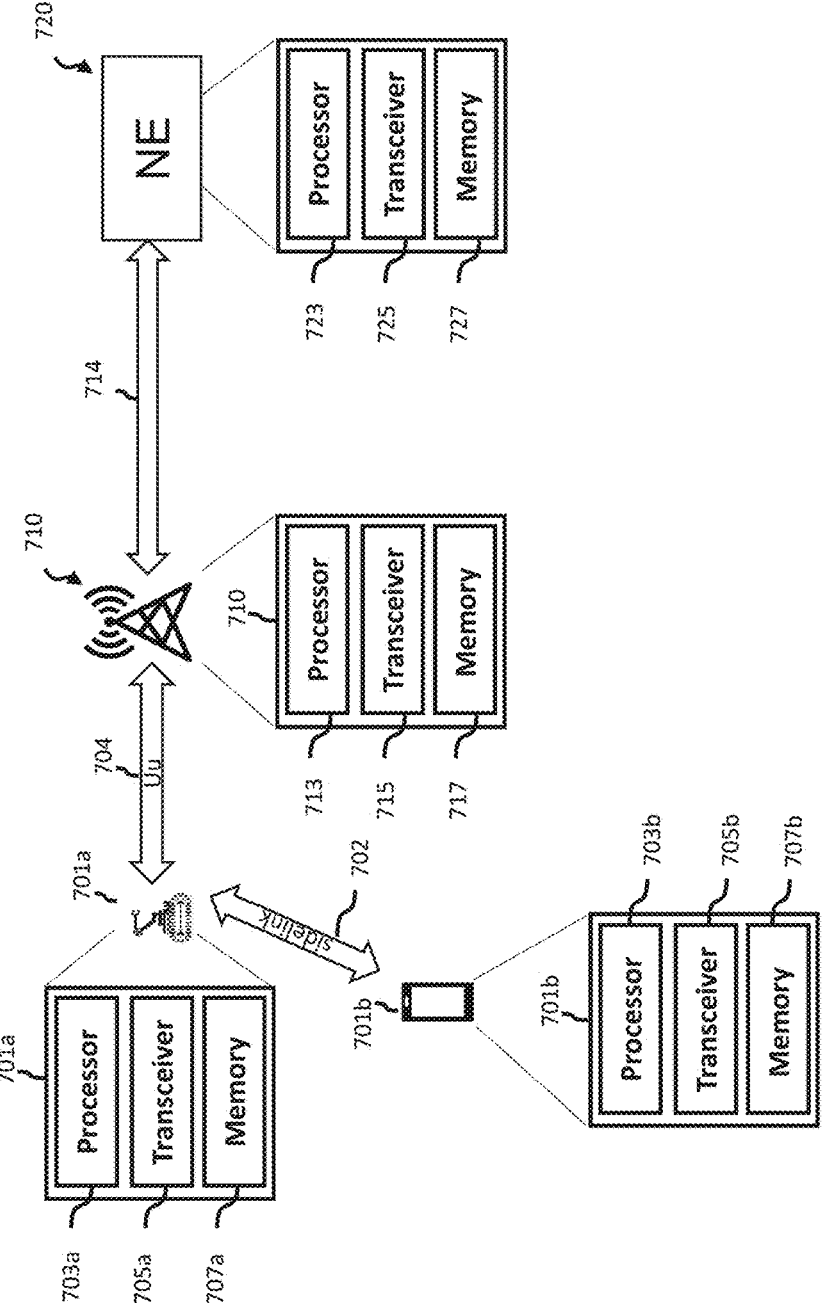
FIG. 7 shows a schematic diagram illustrating an example communication system 700 for assisting positioning over sidelink according to an embodiment of the disclosure.
Figure 7:
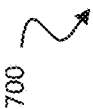

FIG. 7 shows a schematic diagram illustrating an example communication system 700 for assisting positioning over sidelink according to an embodiment of the disclosure.

The communication system 700 may include, according to an example, one or more LRD 701a or MRP, respectively, one or more user device 701b or UE, respectively, a base station or RAN node 710 and a network entity 720 which may be an entity of the radio access network (RAN), e.g. an AMF or a network entity of the core network. Base station 710 and/or network entity 720 may be configured for positioning. A location server may be implemented on the base station 710 and/or the network entity 720. Thus, a network element for positioning according to this disclosure may be implemented by the base station 710 and/or the network entity 720.

In the example shown in FIG. 7, the LRD 701a may be, by way of example, mobile reference points 104, 104b as described above with respect to FIGS. 2 to 6. In one example, the LRD 701a may be a radio-equipped mobile device with knowledge of its own position, e.g. robot in factory. In another example, the LRD 701a may be a static or semi-mobile reference point, i.e. a radio-equipped device with knowledge of its own position. The LRD 701a may also be, for example, a mobile device with knowledge of its own position, e.g. a mobile phone, an intelligent terminal, a tablet computer (tablet), a notebook computer (laptop), a video game console, a multimedia player, vehicle, device to device (D2D) equipment, or any smart device which has knowledge of its own position and supports a positioning function.

The LRD 701a may be connected to base station 710, for instance, via Uu channel 704. The Uu channel 704 or also referred to as E-UTRAN Uu interface, also known as LTE Uu or simply LTE radio interface, allows data transfer between the ENodeB (or base station 1710) and the LRDs.

As can be seen from FIG. 7, the LRD(s) 701a may comprise a processing circuitry 703a for instance, a processor 703a, for processing and generating data, a transceiver 705a (also referred to as communication interface 705a), including, for instance, an transmitter, a receiver and an antenna, for exchanging data with the other components of the communication system 700, and a non-transitory memory 707a for storing data. The processor 703a of the LRD 701a may be implemented in hardware and/or software.

In the example shown in FIG. 7, the user device 701b may be, by way of example, a portable device, in particular a smartphone. However, one or more of these user devices 701b may also be, by way of example, a laptop computer, a mobile vehicle or a machine-type device. The device 701b may be configured to communicate with the LRD 701a, via sidelink channel 702 without the base station 710. The base station 710 may be configured to communicate with the network entity 720 via communication link 714.

As can be seen from FIG. 7, the user device(s) 701b may comprise a processing circuitry 703b for instance, a processor 703b, for processing and generating data, a transceiver 705b (also referred to as communication interface 705b), including, for instance, an transmitter, a receiver and an antenna, for exchanging data with the other components of the communication system 700, and a non-transitory memory 707b for storing data. The processor 703b of the user device 701b may be implemented in hardware and/or software.

The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The non-transitory memory 1707a, 1707b may store data as well as executable program code which, when executed by the processor 1703a, 1703b, causes the respective first user device 1701a, 1701b to perform the functions, operations and methods described in this disclosure.

In an example, the base station 710, may have a similar architecture as the user device(s) 701b, i.e. may comprise a processor 713 for processing and generating data, a transceiver 715 (also referred to as communication interface 715) for exchanging data with the other components of the communication system 700 as well as a memory 717 for storing data. Likewise, as illustrated in FIG. 7, the network entity 720 may have a similar architecture as the user device(s) 701b, i.e. may comprise a processor 723 for processing and generating data, a transceiver 725 (also referred to as communication interface 725) for exchanging data with the other components of the communication system 700 as well as a memory 727 for storing data.

In the following, the functionalities of the entities in FIG. 17 are described in detail.

The LRD 701a may correspond to the LRD 104, 104b described above with respect to FIGS. 2 to 6. The LRD 701a may be used for assisting positioning over sidelink.

The LRD 701a comprises a communication interface 705a configured to receive a location assistance request from a user device 701b, e.g. a user device 105 as described above with respect to FIGS. 2 to 6, or a network element 710, 720 for positioning, e.g. a network element 120 as described above with respect to FIGS. 2 to 6. The location assistance request indicates a location reference for a positioning of the user device 701b over a sidelink 702.

The communication interface 705a is further configured to transmit a location message over the sidelink 702, wherein the location message indicates that the LRD 701a is capable of serving as a location reference for the positioning of the user device 701b over sidelink 702.

The location message may comprise at least one of: location data indicating a current position of the LRD 701a, an identifier of the LRD 701a, a reference signal to enable determining a signal strength, a time stamp, an accuracy of the location reference, a confidence level of the location reference.

The location assistance request may comprise at least one of: an identity of the user device 701b, an identity of a geographic area or an identity of a zone where the user device 701b is located, a desired accuracy of location estimate, a desired latency of the location reference, a desired characteristic of positioning reference signal from the location reference, a desired reference signal receive power from the location reference, a distance of the LRD to a target location, a desired channel quality of a link from the LRD to the user device, positioning capabilities of the LRD 701a, including at least one of: the number of supported antennas for positioning, the number of supported frequency layers for positioning, a supported bandwidth for positioning, maximum transmit power for positioning, battery constraints, positioning accuracy and a confidence level of positioning.

The communication interface 705a may be configured to transmit the location message to the user device 701b based on at least one of: a distance of the LRD 701a to the user device 701b, a priority of serving as a location reference for the user device 701b, a positioning capability of the LRD 701a, positioning data of the user device 701b.

The LRD 701a comprises a processor 703a, which may be configured to activate the LRD 701a as a location reference based on the reception of the location assistance request from the user device 701b and upon a decision to serve as a location reference for the positioning of the user device 701b. The decision to serve as a location reference may be based on a predefined criterion. The predefined criterion may comprise at least one of: a distance of the LRD 701a to the user device 701b, a channel quality of a link between the LRD 701a and the user device 701b, a positioning capability of the LRD 701a.

The location assistance request may comprise a move request, the move request instructing the LRD 701a to move to a specific location or area, e.g. as described above with respect to FIGS. 4 and 5 (instructed MRP according to the advanced solution).

The communication interface 705a may be configured to transmit a response of the move request if the processor 703a has determined that the LRD 701a is capable of moving to the specific location or area.

The communication interface 705a may be configured to report a failure message to the network element 710, 720 if a movement failure of the LRD 701a moving to the specific location or area has been detected.

The user device 701b may correspond to the user device 105 described above with respect to FIGS. 2 to 6. The user device 701b comprises a communication interface 705b, configured to: transmit a location assistance request, wherein the location assistance request indicates a location reference for a positioning of the user device 701b over a sidelink 702; and receive a location message over the sidelink 702, wherein the location message indicates a LRD 701a that is capable of serving as a location reference for a positioning of the user device 701b over the sidelink 702.

The location message may comprise at least one of: location data indicating a current position of the LRD 701a, an identifier of the LRD 701a, a reference signal to enable determining a signal strength, a time stamp, an accuracy of the location reference, a confidence level of the location reference, e.g. as described above with respect to FIG. 3.

The location assistance request may comprise at least one of: an identity of the user device 701b, an identity of a geographic area or an identity of a zone where the user device 701b is located, a desired accuracy of location estimate, a desired latency of the location reference, a desired characteristic of positioning reference signal from the location reference, a desired reference signal receive power from the location reference, a distance of the LRD to a target location, a desired channel quality of a link from the LRD 701a to the user device 701b, positioning capabilities of the LRD 701a, including at least one of: the number of supported antennas for positioning, the number of supported frequency layers for positioning, a supported bandwidth for positioning, maximum transmit power for positioning, battery constraints, positioning accuracy and a confidence level of positioning.

The communication interface 705b may be configured to transmit the location assistance request based on a trigger condition.

The trigger condition may comprise at least one of: an accuracy of a location estimate of the user device 701b is below a predetermined threshold, an accuracy of a location estimate of the user device 701b) is below a threshold that depends on a confidence level, a time stamp of the location estimate is beyond a pre-defined timing window.

The communication interface 705b may be configured to select the LRD 701a as location reference based on a predefined criterion.

The predefined criterion may be based on a quality of a link between the user device 701*b* and the LRD 701*a*.

The network element 710, 720 shown in FIG. 7 may be used for positioning. The network element 710, 720 comprises a communication interface 715, 725, configured to: transmit a request to a LRD 701*a* based on location data of the LRD 701*a* stored in the network element 710, 720, wherein the request instructs the LRD 701*a* to transmit a location message, wherein the location message indicates that the LRD is capable of serving as a location reference for a positioning of the user device 701*b* over sidelink 702.

The communication interface 715, 725 is further configured to: receive a response on a request to a user device 701*b* requesting the user device to transmit a location assistance request, wherein the location assistance request indicates a location reference for a positioning of the user device 701*b* over a sidelink 702.

The request to the LRD 701*a* or the user device 701*b* may comprise at least one of: an identity of the user device 701*b*, an identity of a geographic area or an identity of a zone where the user device 701*b* is located, a desired accuracy of location estimate, a desired latency of the location reference, a desired characteristic of positioning reference signal from the location reference, a desired reference signal receive power from the location reference, a distance of the LRD 701*a* to a target location, a desired channel quality of a link from the LRD 701*a* to the user device 701*b*, positioning capabilities of the LRD 701*a*, including at least one of: the number of supported antennas for positioning, the number of supported frequency layers for positioning, a supported bandwidth for positioning, maximum transmit power for positioning, battery constraints, positioning accuracy and a confidence level of positioning.

The request to the user device 701*b* may instruct the user device to transmit the location assistance request as a broadcast message or as a groupcast message.

The communication interface 715, 725 may be configured to transmit the request to the LRD 701*a* or the user device 701*b* based on a trigger condition.

The trigger condition may comprise at least one of: an accuracy of a location estimate of the user device 701*b* is below a predetermined threshold, an accuracy of a location estimate of the user device 701*b* is below a threshold that depends on a confidence level, a time stamp of the location estimate is beyond a pre-defined timing window.

The communication interface 715, 725 may be configured to transmit a move request to the LRD 701*a* based on the location data of the LRD 701*a*, wherein the move request instructs the LRD 701*a* to move to a specific location or area.

The move request may be based on a predefined criterion. The predefined criterion may comprise at least one of: a number of user devices 701*b* within the specific location or area requesting support of the LRD as a location reference; a density of obstacles between a current position of the LRD 701*a* and the specific location or area; a distance between the current position of the LRD 701*a* and the specific location or area; a value indicating a strictness of the location assistance request for the user device 701*b*.

FIG. 8 shows a schematic diagram illustrating an example method 800 for assisting positioning over sidelink according to an embodiment of the disclosure.

The method 800 comprises: receiving 801, by a LRD, e.g. a LRD 104, 701*a* as described above with respect to FIGS. 2 to 7, a location assistance request from a user device, e.g. a user device 105, 701*b* as described above with respect to FIGS. 2 to 7, or a network element for positioning, e.g. a network element 120, 710, 720 for positioning as described above with respect to FIGS. 2 to 7, wherein the location assistance request indicates a location reference for a positioning of the user device 105, 701*b* over a sidelink 702.

The method 800 comprises: transmitting 802, by the LRD 104, 701*a*, a location message over the sidelink 702, wherein the location message indicates that the LRD 104, 701*a* is capable of serving as a location reference for the positioning of the user device 105, 701*b* over sidelink 702.

FIG. 9 shows a schematic diagram illustrating an example method 900 for requesting a location reference for positioning of a user device according to an embodiment of the disclosure.

The method 900 comprises: transmitting 901, by the user device, e.g. a user device 105, 701*b* as described above with respect to FIGS. 2 to 7, a location assistance request, wherein the location assistance request indicates a location reference for a positioning of the user device 105, 701*b* over a sidelink 702.

The method 900 comprises: receiving 902, by the user device 105, 701*b*, a location message over the sidelink 702, wherein the location message indicates a LRD, e.g. a LRD 104, 701*a* as described above with respect to FIGS. 2 to 7, that is capable of serving as a location reference for a positioning of the user device 105, 701*b* over the sidelink 702.

The present disclosure also supports a computer program product including computer executable code or computer executable instructions that, when executed, causes at least one computer to execute the performing and computing steps described herein, in particular the methods and procedures described above. Such a computer program product may include a readable non-transitory storage medium storing program code thereon for use by a computer. The program code may perform the processing and computing steps described herein, in particular the methods and procedures described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above disclosures. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A location reference device (LRD) for assisting positioning over sidelink, comprising:
   a processing circuitry, and
   a communication interface configured to:
      receive a location assistance request from a user device or a network element for positioning, wherein the location assistance request indicates a location reference for a positioning of the user device over a sidelink; and
      transmit a location message over the sidelink in response to the location assistance request, wherein the location message indicates that the LRD is capable of serving as a location reference for the positioning of the user device over sidelink,
      wherein the location assistance request comprises a move request instructing the LRD to move to a specific location or area for assisting one or more user devices to improve positioning accuracy.

2. The LRD of claim 1, wherein the location message comprises:
   location data indicating a current position of the LRD,
   an identifier of the LRD,
   a reference signal to enable determining a signal strength,
   a time stamp,
   an accuracy of the location reference, and/or
   a confidence level of the location reference.

3. The LRD of claim 1,
   wherein the location assistance request comprises:
   an identity of the user device,
   an identity of a geographic area or an identity of a zone where the user device is located,
   a desired accuracy of location estimate,
   a desired latency of the location reference,
   a desired characteristic of positioning reference signal from the location reference,
   a desired reference signal receive power from the location reference,
   a distance of the LRD to a target location,
   a desired channel quality of a link from the LRD to the user device, and/or
   positioning capabilities of the LRD, including: a number of supported antennas for positioning, a number of supported frequency layers for positioning, a supported bandwidth for positioning, maximum transmit power for positioning, battery constraints, and/or positioning accuracy and a confidence level of positioning.

4. The LRD of claim 1,
   wherein the communication interface is configured to transmit the location message to the user device based on:

a distance of the LRD to the user device,
   a priority of serving as a location reference for the user device,
   a positioning capability of the LRD, and/or
   positioning data of the user device.

5. The LRD of claim 1, wherein the communication interface is configured to transmit a response to the move request when the processing circuitry has determined that the LRD is capable of moving to the specific location or area.

6. The LRD of claim 1, wherein, when the processing circuitry has determined that the LRD is capable of moving, the communication interface is further configured to transmit an OK message indicating acceptance of the move request.

7. The LRD of claim 6, wherein the communication interface is further configured to transmit a movement failure when the LRD is unable to complete the movement instructed by the move request.

8. A user device, comprising:
   a processing circuitry, and
   a communication interface, configured to:
      transmit a location assistance request, wherein the location assistance request indicates a location reference for a positioning of the user device over a sidelink; and
      receive a location message in response to the location assistance request over the sidelink, wherein the location message indicates a location reference device (LRD)-that is capable of serving as a location reference for a positioning of the user device over the sidelink,
      wherein the location assistance request comprises a move request instructing the LRD to move to a specific location or area for assisting one or more user devices to improve positioning accuracy.

9. The user device of claim 8, wherein the location message comprises:
   location data indicating a current position of the LRD,
   an identifier of the LRD,
   a reference signal to enable determining a signal strength,
   a time stamp,
   an accuracy of the location reference, and/or
   a confidence level of the location reference.

10. The user device of claim 8, wherein the location assistance request comprises:
   an identity of the user device,
   an identity of a geographic area or an identity of a zone where the user device is located,
   a desired accuracy of location estimate,
   a desired latency of the location reference,
   a desired characteristic of positioning reference signal from the location reference,
   a desired reference signal receive power from the location reference,
   a distance of the LRD to a target location,
   a desired channel quality of a link from the LRD to the user device, and/or
   positioning capabilities of the LRD, including: a number of supported antennas for positioning, a number of supported frequency layers for positioning, a supported bandwidth for positioning, maximum transmit power for positioning, battery constraints, and/or positioning accuracy and a confidence level of positioning.

11. The user device of claim 8,
   wherein the communication interface is configured to transmit the location assistance request based on a trigger condition.

12. A network element for positioning, comprising:

a processing circuitry, and a communication interface, configured to:

transmit a request to a location reference device (LRD) based on location data of the LRD stored in the network element, wherein the request instructs the LRD to transmit a location message, wherein the location message indicates that the LRD is capable of serving as a location reference for a positioning of a user device over sidelink; and receive a response on a request to a user device requesting the user device to transmit a location assistance request, wherein the location assistance request indicates a location reference for a positioning of the user device over a sidelink, and the location assistance request comprises a move request instructing the LRD to move to a specific location or area for assisting one or more user devices to improve positioning accuracy.

13. The network element of claim 12, wherein the request to the LRD or the user device comprises:

an identity of the user device, an identity of a geographic area or an identity of a zone where the user device is located, a desired accuracy of location estimate, a desired latency of the location reference, a desired characteristic of positioning reference signal from the location reference, a desired reference signal receive power from the location reference, a distance of the LRD to a target location, a desired channel quality of a link from the LRD to the user device, and/or positioning capabilities of the LRD, including: a number of supported antennas for positioning, a number of supported frequency layers for positioning, a supported bandwidth for positioning, maximum transmit power for positioning, battery constraints, and/or positioning accuracy and a confidence level of positioning.

14. The network element of claim 12, wherein the request to the user device instructs the user device to transmit the location assistance request as a broadcast message or as a groupcast message.

15. The network element of claim 12, wherein the communication interface is configured to transmit the request to the LRD or the user device based on a trigger condition.

16. The network element of claim 12, wherein the move request is generated based on at least one of: a number of user devices within the specific location or area requesting support of the LRD as a location reference, a density of obstacles between a current position of the LRD and the specific location or area, a distance between the current position of the LRD and the specific location or area, or a value indicating a strictness of the location assistance request for the user device.

17. The network element of claim 12, wherein the communication interface is configured to transmit the move request to the LRD based on location data of the LRD stored in the network element.

18. The network element of claim 12, wherein the processing circuitry is configured to determine whether to initiate the move request based on one or more triggering conditions comprising:

(i) a number of user devices within an area requesting location reference support exceeding a predetermined threshold;

(ii) a density of obstacles surrounding one or more user devices;

(iii) a distance between the LRD and the one or more user devices being smaller than a predefined threshold; and/or (iv) a change in a positioning accuracy requirement of at least one user device.

* * * * *